Feb. 28, 1961 W. M. PELINO 2,973,430
RAILROAD-CAR WHEEL LOCATOR
Filed March 25, 1957
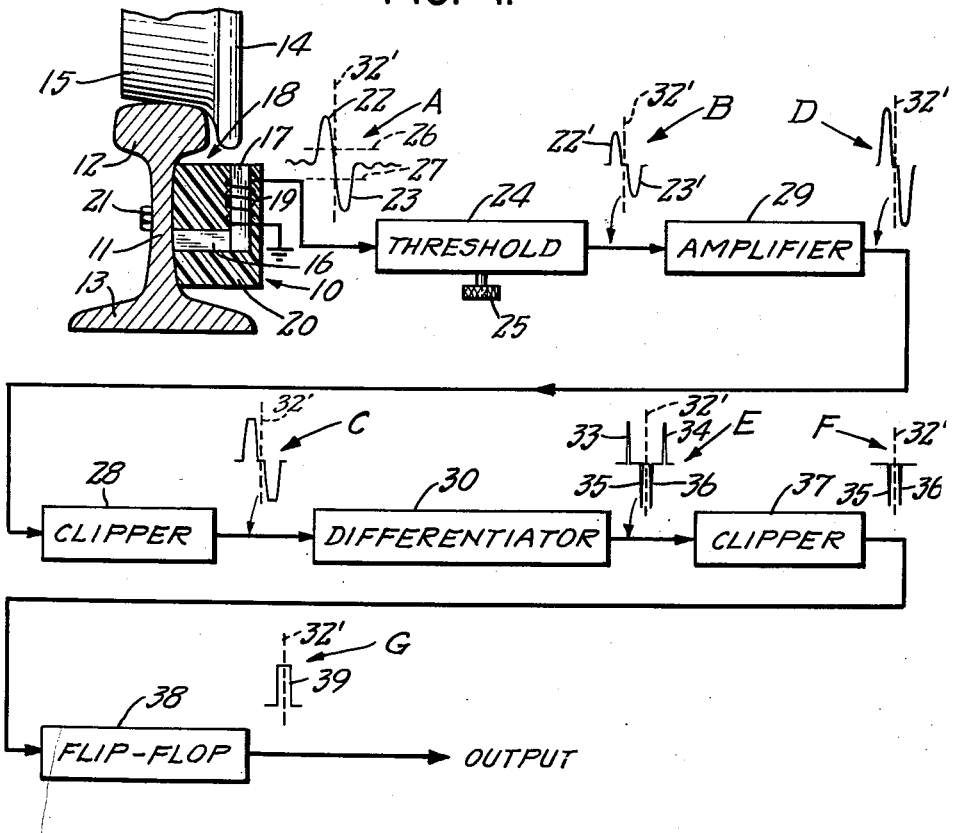
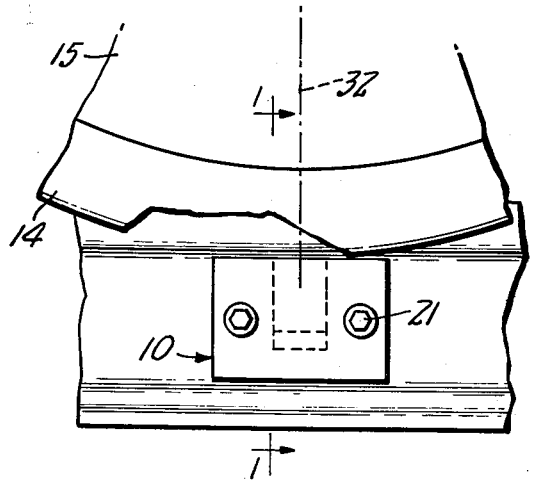
INVENTOR
WILLIAM M. PELINO
BY
ATTORNEYS ered here as 2,973,430
Patented Feb. 28, 1961

2,973,430
RAILROAD-CAR WHEEL LOCATOR

William M. Pelino, Garden City, N.Y., assignor to Servo Corporation of America, New Hyde Park, N.Y., a corporation of New York Filed Mar. 25, 1957, Ser. No. 648,028

2 Claims. (Cl. 246—249)

My invention relates to an improved means for identifying the instant of time at which a railroad-car wheel passes a given monitoring point on a length of railroad track. This invention incorporates improvements over the invention disclosed in Gallagher-McDonald application, Serial No. 627,330, filed December 10, 1956, now abandoned.

It is an object of the invention to provide an improved device of the character indicated.

It is a specific object to provide an automatic electrical device which can monitor the passage of railroad wheels past a given point along a length of track and which can clearly identify the instant of passage of the wheel center at said point, regardless of instantaneous wheel speed.

It is another specific object to meet the above objects with a device which can develop an electrical control pulse symmetrically straddling the time at which the wheel center passes the monitoring point, regardless of instantaneous wheel speed.

It is a general object to meet the above objects with a device of relative simplicity, unaffected by weather, and relatively protected against possible damage by bars, rods, chains and the like as may be dragged by a passing car.

Other objects and various further features of novelty and invention will be pointed out or will occur to those skilled in the art from a reading of the following specification, in conjunction with the accompanying drawings. In said drawings, which show for illustrative purposes only, a preferred form of the invention:

Fig. 1 is an electrical diagram schematically showing a general organization of circuits in accordance with the invention, a rail of the track at the monitoring point being shown in cross section; and Fig. 2 is a fragmentary side view of a railroad wheel passing the monitoring point of the rail section in Fig. 1.

Briefly stated, my invention contemplates application to a rail section equipped with a magnetic wheel-trip device of the character described in detail in said copending application. In such a device, a polarized magnetic gap is presented between a localized part of the head of the rail and a point spaced laterally inwardly of said localized part. All wheel flanges on one side of the train pass through the gap, and a winding coupled to the core of the wheel trip develops a typical electrical signal for the passage of each wheel flange through the gap. Generally speaking, such typical signal comprises a first predominant polarized voltage excursion or surge, followed by a similar excursion of opposite polarity. For many purposes, it is sufficient to use merely one of these voltage excursions to trigger gate circuits or the like, as may be needed for operation by the trip.

For certain applications, however, it is necessary to uniquely define the instant of time at which a given wheel center passes the vertical plane of the monitoring point, namely the longitudinal center (i.e. longitudinal, in the sense along the track) of the magnetic gap of the wheel trip, and it is also necessary that this be done with an accuracy that is not affected by the instantaneous speed of the passing wheel. According to the invention, this object is achieved by employment of special-purpose amplifier circuits performing differentiating functions, and including preferably also threshold and clipping functions, whereby for each passage of a car-wheel flange through the gap, the ultimate electrical output is developed symmetrically (in time) with respect to the instant at which the wheel center passes the vertical plane of the monitoring point.

Referring to the drawings, my invention is shown in application to a magnetic wheel-trip device 10 of the type described in said application, and mounted to the web 11 of a section of railroad track, having a head 12 and base 13. The wheel trip 10 is shown mounted on the inside of the web 11, meaning that it is generally beneath the flange 14 of a passing railroad wheel 15. The wheel trip may comprise an elongated core of magnetic flux-conducting material, with various configurations, as discussed in said copending application, but the core is presently shown to comprise two flux-conducting legs 16—17; part of the core, such as the leg 17, is preferably permanently magnetized. The bottom leg 16 directly connects the vertical leg 17 with the web 11 of the rail section, and since the rail is of magnetic flux-conducting material, a polarized magnetic gap is established at 18, at a location to be cut by passing wheel flanges 14. A winding 19 is coupled to the core, and the entire trip may be cast in suitable insulating plastic 20, secured as by bolts 21 to the rail section.

For each passage of a car wheel at the monitoring point, represented by the location of the wheel trip 10, an electrical voltage output is developed generally of the form designated A in Fig. 1, there being a predominant first voltage excursion 22 as the leading edge of the flange 14 first cuts the flux in the gap 18, and there being a similar but oppositely polarized voltage excursion 23 as said flange 14 leaves the gap 18. Minor excursions in the form of noise may occur both before and after the surges 22—23, but the surges 22—23 reliably substantially exceed all such noise, for train speeds above four or five miles per hour.

In order that the circuits of my invention shall be responsive to the predominant signals 22—23 to the exclusion of any noise signals, I prefer first to employ a threshold circuit 24 so as to pass only those portions of the signals 22—23 as exceed the selected threshold. A manual adjustment 25 will be understood to designate the selectively controllable nature of the threshold, upper and lower limits of which are suggested by levels 26—27 at A. The output of the threshold circuit 24 will thus be generally of the form shown at B, there being a first voltage surge 22' representing the upper part of the surge 22, and a second oppositely polarized surge 23' corresponding to the top of the surge 23.

Wheel flanges 14 may project variously into the gap 18, depending upon the worn condition of the wheel and depending upon the instantaneous axial position of a given wheel-and-axle assembly. For this reason, I prefer next to clip all signals in order to develop square waves, as shown at C. The clipper 28 will be understood to be an amplifier for which the input signal is always of sufficient magnitude to drive the clipper and amplifier to saturation. Thus, I supplement the clipper 28 with an amplifier 29 to assure the clipping function, suggested by the graph C, the function of amplifier 29 being suggested at D.

Having formed square waves corresponding to the predominant surges 22—23, I next differentiate at 30, thereby obtaining a pattern of polarized spikes, depicted at E, in which for spikes of any given polarity there is complete timing symmetry, with respect to the instant at which the car-wheel center passes the vertical plane of the wheel trip. This vertical plane is designated by the dashed line 32 in Fig. 2, and the time at which the wheel center passes this location is suggested by the dashed line 32' in each of the wave-form diagrams designated by capital letters in Fig. 1.

As indicated, the voltage spikes developed by the differentiator 30 provide control voltages which are symmetrically spaced with respect to the time at which the wheel center passes the vertical plane of the monitoring point. Depending upon the desired use of this information, as, for example, whether a relatively long or a relatively short output control pulse is necessary, I may select either the positive spikes 33—34 on the one hand, on the negative spikes 35—36 on the other hand, for use in a control circuit. In the form shown, the negative spikes 35—36 are selected by a second clipper 37, and these voltage spikes 35—36 are utilized to excite a flip-flop circuit 38, whereby a single control pulse 39 is developed symmetrically about the axis 32'. The leading and trailing walls of the control pulse 39 will be understood to be defined in time by the timing of the negative spikes 35—36.

Depending upon the nature of the gate, shutter or other device (not shown) to be operated by pulses 33—34 or 35—36 or 39, it is desirable to provide for manual adjustment of pulse-spacing (33—34 or 35—36) or pulse-width (39) as the case may be. Adjustment of threshold level at 25 will be understood to provide this function as long as the levels 26—27 are set above noise and within the peak amplitudes of pulses 22—23, as will be understood.

It will be seen that I have described a relatively simple means, whereby the instant of passage of a wheel center past a monitoring point may be more accurately defined. This is actually the instant at which the wheel rim is tangent to the rail at the monitoring point, but because the wheel is of relatively large diameter and of a diameter which can vary from wheel to wheel, the magnetic pick up would ordinarily deliver a voltage output (see diagram at A in Fig. 1) having a period equivalent to several inches of the wheel movement, and to respond merely to one of both of the surges 22—23 would be to create certain ambiguities; in speed-measuring devices using wheel trips as at 10, the ambiguity involved in not refining the wheel-trip signal can be disastrous to the speed measurement. This is particularly so in situations in which the base between two wheel trips 10 is short, as in freight-yard classification installations, where the speed of humped cars is to be monitored and controlled. The circuits of the present invention eliminate ambiguity in the definition of the tangent point and deliver an output pulse symmetrical about this point, regardless of the speed of the train.

While I have described the invention in detail for the preferred form shown, it will be understood that modifications may be made within the scope of the invention as defined in the claims which follow.

I claim:

1. In combination, a rail section of magnetic flux-conducting material and including a head and a base portion integrally formed at opposite ends of an upstanding web portion, said rail head being adapted to accommodate a railroad wheel having a flange on one side of said head, elongated magnetically polarized core means of magnetic flux-conducting material and mounted on said one side of said rail section with one end of said core means in substantial adjacency with one of said portions and orienting the other end of said core means to face generally upwardly at a location spaced laterally from the adjacent portion of said head to such an extent that a magnetic flux gap is defined between said other end and said rail head, an electrical winding coupled to said core means, a threshold circuit connected to said winding and passing to the output thereof only substantially those signals which exceed a given preselected minimum threshold level, clipper means responsive to the output of said threshold circuit and developing a square wave for each voltage pulse in said output, differentiating means responsive to the output of said clipper means, second clipper means responsive to the differentiated signals and passing substantially only differentiated signals of one polarity, whereby for each passage of a car wheel through said gap, said second clipper means develops two control pulses symmetrically positioned on opposite sides of the center line of said gap.

2. The combination of claim 1, and including a flip-flop circuit triggered by the output of said second clipper, whereby for each passage of a car wheel through said gap a single pulse may be developed symmetrically straddling the center line of said gap.

References Cited in the file of this patent

UNITED STATES PATENTS

| 234,657 | Conklin | Nov. 23, 1880 |
| 1,820,042 | Baseler | Aug. 25, 1931 |
| 2,408,078 | Labin | Sept. 24, 1946 |
| 2,617,023 | Weller | Nov. 4, 1952 |

FOREIGN PATENTS

| 112,527 | Switzerland | Feb. 20, 1925 |